United States Patent [19]

Giannesini et al.

[11] Patent Number: 5,348,097
[45] Date of Patent: Sep. 20, 1994

[54] DEVICE FOR CARRYING OUT MEASURING AND SERVICING OPERATIONS IN A WELL BORE, COMPRISING TUBING HAVING A ROD CENTERED THEREIN, PROCESS FOR ASSEMBLING THE DEVICE AND USE OF THE DEVICE IN AN OIL WELL

[75] Inventors: Jean-Francois Giannesini, Saint Cloud; Jean-Baptiste Fay, Paris, both of France

[73] Assignee: Institut Francais du Petrole, Rueil Malmaison, France

[21] Appl. No.: 975,887

[22] Filed: Nov. 13, 1992

[30] Foreign Application Priority Data

Nov. 13, 1991 [FR] France ................ 91 14064

[51] Int. Cl.$^5$ ........................................... E21B 19/00
[52] U.S. Cl. ................... 166/385; 166/65.1; 166/250
[58] Field of Search ............... 166/385, 383, 250, 65.1

[56] References Cited

U.S. PATENT DOCUMENTS

| | | |
|---|---|---|
| 2,204,737 | 6/1940 | Swallow et al. |
| 4,744,245 | 5/1988 | White .................. 166/250 |
| 4,901,804 | 2/1990 | Thometz et al. ........... 166/250 X |
| 4,928,758 | 5/1990 | Siegfried, II ........... 166/250 X |
| 4,928,759 | 5/1990 | Siegfried, II et al. ........ 166/65.1 |
| 4,979,563 | 12/1990 | Patel .................. 166/250 |
| 4,979,567 | 12/1990 | Rubbo ................. 166/383 |
| 5,010,764 | 4/1991 | Taylor ................. 166/250 |
| 5,042,297 | 8/1991 | Lessi .................. 166/250 |
| 5,159,978 | 11/1992 | Tomek et al. ............ 166/250 |
| 5,207,096 | 5/1993 | Castel et al. ........... 166/250 X |

FOREIGN PATENT DOCUMENTS

| | | |
|---|---|---|
| 6507074 | 7/1975 | Australia . |
| 937172 | 12/1955 | Fed. Rep. of Germany . |
| 2269777 | 11/1975 | France . |
| 9108098 | 6/1991 | World Int. Prop. O. . |

Primary Examiner—Thuy M. Bui
Assistant Examiner—Frank S. Tsay
Attorney, Agent, or Firm—Antonelli, Terry, Stout & Kraus

[57] ABSTRACT

The invention relates to a device for carrying out measuring and/or servicing operations in a well (4), comprising a tubing (2) adapted for being coiled round a drum (1) and a measuring instrument (3) fastened to the end of the tubing.

The tubing comprises inwardly a rod (17) elastic in flexure and resisting to compressive stress, well suited for allowing the introduction thereof into tubing (2), notably by thrust.

An energy or information transfer line (12) is incorporated during manufacturing of rod (17).

Rod (17) is made of a polymeric material comprising reinforcing fibers and it is centered inside the tubing.

The invention further relates to a process for assembling the rod in the tubing and to the use of the device in a well producing an oil effluent.

12 Claims, 2 Drawing Sheets

DEVICE FOR CARRYING OUT MEASURING AND SERVICING OPERATIONS IN A WELL BORE, COMPRISING TUBING HAVING A ROD CENTERED THEREIN, PROCESS FOR ASSEMBLING THE DEVICE AND USE OF THE DEVICE IN AN OIL WELL

BACKGROUND OF THE INVENTION

The present invention relates to a device, a mounting process and an application of this device allowing measurings and/or servicings to be carried out in a well at the level of the surrounding formations.

The invention is notably applicable when measurings and/or servicings are to be carried out at the level of geologic formations crossed through by a well. In this case, the measurings performed may comprise recording the bottomhole pressure and temperature, measuring the electrical resistivity, as well as acoustic, nuclear measurings, etc. Perforating guns, completion tools or visual display cameras may also be used.

These measuring and/or servicing techniques are known by specialists and will not be described more in detail hereafter.

The present invention is particularly well suited for carrying out measurings and/or servicings in an oil production well comprising a drain strongly inclined with respect to the vertical or even horizontal.

Document U.S. Pat. No. 4,685,516 describes a well-known system for carrying out measurings or servicings in a well, comprising a metallic tubing coiled by plastic strain round a drum, an electric transmission cable being slipped into the tubing. Setting such a cable is problematic because, when the tubing is completely uncoiled, the cable must be pulled by a tool pumped in the tubing. Moreover, during coiling and uncoiling operations from the drum, the cable exhibits a longitudinal mobility since its diameter is smaller than the inside diameter of the tubing, which often causes elongations which may accumulate in loops inside the tubing and eventually damage the cable itself.

Patent FR-2,631,708 describes a known device for carrying out measurings and servicings in a well, which improves the technique by using a rod made of a polymeric material and incorporating the line. But the rod disclosed in this document presents the disadvantage of having such a rigidity that the diameter of the drum is too bulky. Moreover, this rod practically no longer allows fluid pumping.

SUMMARY OF THE INVENTION

The present invention relates to a device for carrying out measurings and/or servicings in a well bore, comprising a tubing adapted for being coiled round a drum, a measuring and/or a servicing instrument arranged at the lower end of said tubing, said tubing comprising inwardly at least one line adapted for energy or information transfer.

The line is included in a rod comprising a polymeric material and reinforcing fibers.

The rod is elastic in flexure and its compressive strength is adapted for allowing the introduction thereof into said tubing, notably by thrust.

The rod may have a cross-section suited for leaving a conduit allowing a fluid to circulate through said tubing.

The rod may comprise a core made of a polymeric material and reinforcing fibers, said core being embedded in a sheath comprising a polymeric material having a breaking elongation higher than that of said core.

The core may comprise glass, carbon or polyaramid fibers embedded in a matrix made of thermoplastic or thermosetting resin.

The core may preferably comprise glass fibers embedded in at least one of the following resins: epoxide, unsaturated polyester, phenolic or vinylester.

The sheath may comprise at least one of the following polymers: polyamide, polyvinylidene fluoride, polyolefin cross-linked or not, polyvinyl chloride, polysulfone, polyphenylene oxide or polyphenylsulfide.

The material of said sheath may comprise fillers suited for decreasing the coefficient of friction and/or the wear between said rod and the inside of said tubing.

The rod may be adapted for withstanding the fluids intended for acidizing operations.

The cross-section of said rod may have substantially the shape of a star comprising at least three branches and said section may be inscribed in a circle of a diameter substantially smaller than the inside diameter of said tubing.

The invention further relates to a process for assembling the device according to the invention and comprising the following stages:
  uncoiling the tubing from its storage drum,
  manufacturing said rod by pultrusion and/or extrusion by incorporating said line,
  pushing said line into said tubing by means of a thrust part adapted to said rod,
  coiling round a drum the tubing comprising inwardly the rod.

In this process, the tubing may remain filled with a fluid during the introduction of said rod into said tubing.

The invention also provides an application of the device to an oil well comprising a part strongly deflected with respect to the vertical.

BRIEF DESCRIPTION OF THE DRAWINGS

Other features and advantages of the invention will be clear from reading the description hereafter given by way of non limitative examples, with reference to the accompanying drawings in which.

DESCRIPTION OF THE PREFERRED EMBODIMENTS

Figure 1:
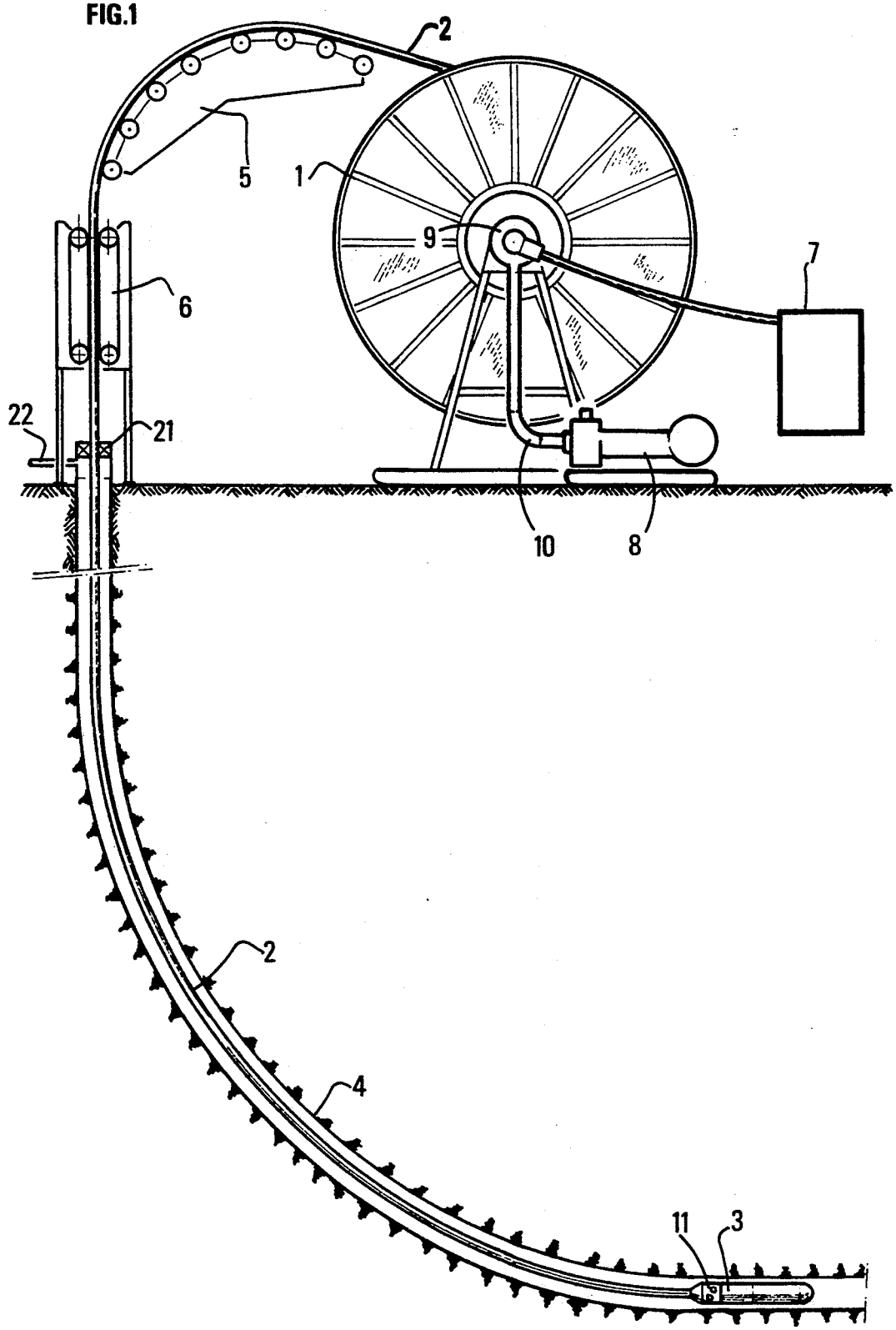
FIG.1 shows a device according to the invention being set in the well.

In FIG. 1, numeral 1 indicates the drum round which is wound a tubing 2 which is of use in the displacements of instrument 3 in well 4, so as to carry out the measurings and/or servicings in one or several zones of well 4.

Tubing 2 leaves drum 1 by passing over a return part 5, such as an array of pulleys, adapted for positioning the tubing in line with the well, whatever the position of the drum and the filling thereof, and runs through traction and thrust means adapted for pushing tubing 2 into the well, for holding it back or for withdrawing it therefrom.

These traction and thrust means 6 may for example consist of two rubber tracks holding tubing 2 tight and moving in the requisite direction for maneuvering it.

Tubing 2, which withstands compressive stress so as to allow thrust on instrument 3, is made up of a very limited number of sections and may preferably comprise only one.

Tubing 2 comprises at least one line adapted for energy and/or information transfer, such as one or several electric, fluidic or optical lines, which allows instrument 3 arranged at the lower end of tubing 2 to be connected to the surface where the upper end of tubing 2 is located. Apparatuses 7 for monitoring and/or controlling instrument 3 are connected to this upper end, possibly by means of a rotating connector.

The upper end of the tubing communicates with a pumping unit 8 through a pipe 10 and a rotating joint 9, so that this pumping unit can inject a fluid into the conduit provided between the rod and the inside of said tubing.

A circulating sub 11 is generally arranged between tool 3 and the lower end of the tubing so as to communicate the inner conduit of the tubing with the annular space between tubing 2 and the wall of the well. The device according to the invention therefore allows to circulate a fluid from the surface towards the well bottom.

The surface installation shown in FIG.1 can be completed with a sealing system 21 arranged around the tubing and fastened to the head of well 4. A pipe 22 communicates with well 4 below seal assembly 21 and allows to inject or to collect a fluid into or coming from the well/rod annulus.

Figure 2:
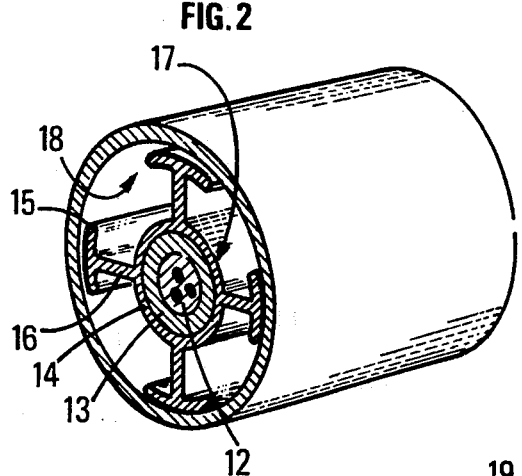
FIG.2 shows a section of the tubing comprising inwardly the rod according to a preferred embodiment.

FIG.2 shows a cross-section of tubing 2 comprising a rod 17 in the inner space thereof.

Rod 17 comprises substantially in its centre a line 12 adapted for electric energy or information transfer. This line is included in a core 13 during the manufacturing of this core by pultrusion or extrusion, as described in document FR-2,631,708.

Core 13 may be made of a composite material comprising reinforcing fibers embedded in a thermoplastic or a thermosetting resin matrix.

The nature of the fibers may be selected from glass, carbon or polyaramid fibers.

The resin may be selected from epoxide, phenolic, unsaturated polyester or vinylester resins.

The outer shape of the core will be substantially cylindrical and its diameter will be such that the deformation induced by the coiling of the tubing round the drum only generates stresses lower than the yield strength of the core material. For example, considering that standard drum diameters are close to 2 meters, the diameter of the core will not be larger than about 17 millimeters when it is made of an epoxide resin reinforced with glass fibers.

Of course, the section of the core will be compatible with the longitudinal strains undergone by the rod in the tubing during coilings outside the well and uncoilings in the well.

The dimensions of tubing 2 are the standard dimensions of coil tubings adapted for being wound round a drum, i.e. an outside diameter ranging between 1 and 2 inches (2.54 to 5.08 cm). The most usual dimensions being 1", 1¼" and 1½ (2.54, 3.18 and 3.81 cm).

The inside diameters of 1¼" and 1½" tubings are respectively 1.076" (2.733 cm) and 1.282" (3.256 cm).

The usual capacity of the drums ranges between 15000 and 18000 feet (4572 to 5486 m).

Line 12 is a single-core or a multicore cable.

Core 13 is embedded in a sheath 14 made of a polymeric material but having generally no reinforcing fibers because the breaking elongation of this material must be higher than that of the core material, so that the sheath can undergo bending stresses in the elastic range.

Sheath 14 comprises a cylindrical part surrounding the core and four centering profiles 15 arranged at 90° around said sheath. The ends of these centering profiles end in T-shape 16. The T-shape of the centering profiles improves the centering of rod 17 in tubing 2 while decreasing the contact pressure of the rod against the inner wall of the tubing by means of the enlarged shape 16 of centering profile 15.

Rod 17 leaves a space 18 inside tubing 2, this space being turned to account for circulating by pumping a fluid between the surface and the other end of tubing 2 by means of circulating sub 11.

The material of the sheath will be selected as a function of ambient conditions (temperature, fluid, stresses) which it will be subjected to, and as a function of the method used for setting it in the tubing, which may require low friction coefficients. These materials may notably be of the polyamide, polyvinylidene fluoride, polyolefin cross-linked or not, polyvinyl chloride, polysulfone, polyphenylene oxide or polyphenylsulfide type.

In case rod 17 is brought into contact with acid, sheath 14 is adapted in such a way that its material withstands acids and protects the core and more particularly the reinforcing fibers against etching.

Figure 3:
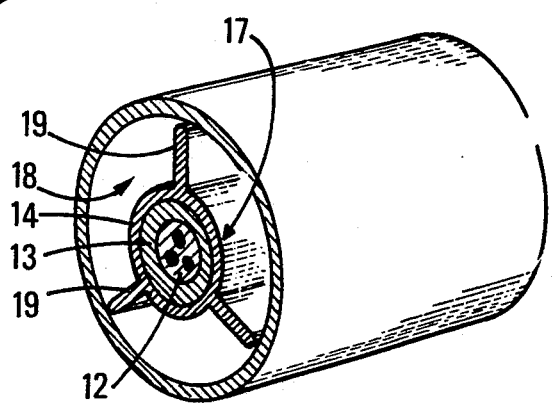
FIG.3 shows the tubing and another rod section.

FIG.3 shows another form of sheath 14 having the shape of a star with three branches 19. Core 13 and line 12 included in the core are centered in tubing 2 while leaving a circulation conduit 18.

These examples of the outer shape of rod 17 are in no way limitative. Other shapes are covered by the present text as long as the functions of the rod according to the invention are provided in an equivalent way.

Particularly, sheath 14 may have a substantially cylindrical outer shape. The thickness of rod 17 with respect to the inside diameter of tubing 2 brings line 12 close enough to the axis of the tubing.

As for manufacturing by extrusion or pultrusion, the sheath will be designed preferably with a substantially constant thickness. This feature is well-known in the art of transformation of plastics through a die. This means that the thicknesses around the core, of arms 15 or 19 and of T 16 must be equivalent so that the die works properly with an acceptable feed speed through this die.

Moreover, without departing from the scope of this invention, the sheath and the core can be made of the same material, but with a particular lay-out of the reinforcing fibers. In this case, the fibers are preferably concentrated as close as possible to the line, the polymeric material towards the outside of the rod comprising no reinforcing fiber.

Figure 4:
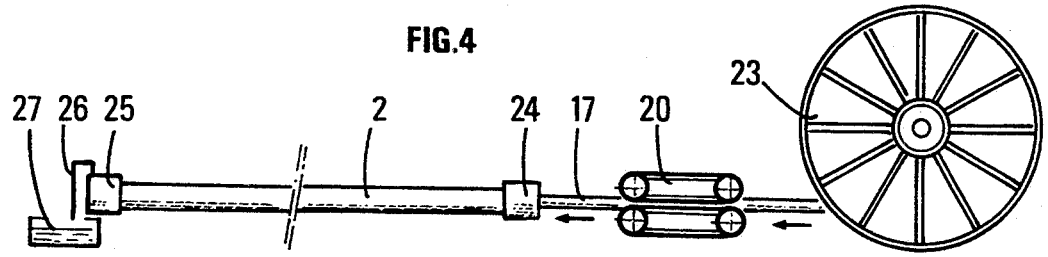
FIG.4 shows the process for running the rod into or out of the tubing.

FIG.4 diagrammatically shows the setting of rod 17 in a tubing 2.

Tubing 2 has been uncoiled from its drum so as to be arranged in a substantially rectilinear way. A sealing means 24 intended to provide at least a partial seal between rod 17 and tubing 2 is fastened to one end of the tubing. At the other end, a stopper 25 seals the tubing but comprises a drain pipe 26. Drain pipe 26 allows partial evacuation of the fluid contained in tubing 2.

In fact, in order to facilitate the thrust of rod 17 in tubing 2 by means of a thrust or traction part 20, it may be advisable to totally fill the tubing with a fluid. The action of this fluid consists in lightening the rod in the tubing and in decreasing the frictional stresses developed by the friction of the profiles for centering the rod on the inner wall of the tubing.

Drain pipe 26 keeps the tubing filled while emptying the tubing of the volume of fluid replaced by the volume of rod 17 introduced in said tubing.

The fluid will mainly have antifriction properties, but moreover, the density thereof can be such that the decrease in the apparent weight of rod 17 is notable. In fact, when the rod "floats" in the tubing, frictions are substantially decreased.

If it is not imposed by the length of the tubing, it is nevertheless possible to drive rod 17 into tubing 2 empty of all liquid.

Drum 23 in FIG.4 comprises rod 17 coiled. Uncoiling from the drum is controlled by traction or thrust part 20, which may be another use of part 6 in FIG.1 or an equivalent system.

The substantially rectilinear lay-out is preferable so as to facilitate the introduction of rod 17 into tubing 2, but it is not absolutely necessary if the curvatures which the tubing may exhibit are not incompatible with this setting method.

Besides, the tubing may be arranged vertically in case of a well in which the total tube length to be equipped with rod 17 can be introduced substantially vertically.

Figure 5:
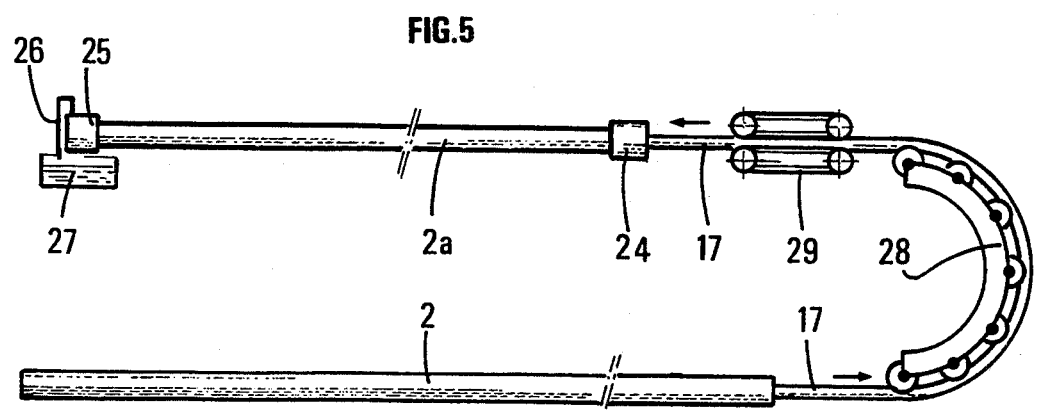
FIG.5 shows the lay-out used for, at the same time, taking the rod out of a worn tubing and introducing the rod into a new tubing.

FIG.5 shows an advantageous operation of a new use of a rod 17 which has already been introduced into a tubing 2. The device according to the invention has been utilized until the wear or the fatigue of the coiled tubing is unacceptable. Tubing 2 must then be scrapped, but rod 17, which has only undergone elastic stresses, can be used again, unless accidents occurred during operation, notably on the transmission line.

The device is uncoiled from the storage drum, parallel to a new tubing 2a. Rod 17 is pulled out of tubing 2 by means of traction and thrust part 29. Rod 17 passes over a roller guide 28 before being introduced by thrust into the new tubing 2a, again by means of thrust part 29. This tubing 2a is provided with the same sealing means 24, with stopper 25 and with drain system 26 and 27, as shown in FIG.4.

We claim:

1. A device for carrying out measurements and/or servicing in a well bore, said device comprising tubing adapted to be coiled around a drum, a measuring and/or servicing instrument arranged at a lower end of said tubing, said tubing containing at least one transfer line adapted to transfer energy or information and arranged within an inner space defined by said tubing, said line also being arranged within a rod comprising a polymeric material and reinforcing fibers, said rod having a longitudinal axis extending close to a longitudinal axis of the tubing, and being elastic during flexure and exhibiting compressive strength adapted to allow introduction of the rod into said tubing by a thrust force.

2. A device as claimed in claim 1, wherein said rod has a cross-section adapted to define an annular conduit within said tubing for allowing a fluid to circulate through said tubing; said rod being arranged centrally within said tube.

3. A device as claimed in claim 1, wherein said rod comprises a sheath containing a core made of polymeric material and reinforcing fibers, said at least one transfer line being embedded within said core and said sheath comprising a polymeric material and exhibiting an elongation at break higher than that of said core.

4. A device as claimed in claim 3, wherein said core comprises glass, carbon, fiber or polyaramid fibers embedded in a matrix made of thermoplastic or thermosetting resin.

5. A device as claimed in claim 3, wherein said core comprises glass fibers embedded in at least one resin selected from the group consisting of epoxide, unsaturated polyester, phenolic and vinylester.

6. A device as claimed in claim 3, wherein said sheath is formed of a polymeric material comprising at least one polymer selected from the group consisting of polyamide, polyvinylidene fluoride, cross-linked polyolefin, non-crosslinked polyolefin, polyvinyl chloride, polysulfone, polyphenylene oxide and polyphenylsulfide.

7. A device as claimed in claim 6, wherein the polymeric material forming the sheath further comprises fillers suitable for decreasing a coefficient of friction and/or the wear between said rod and an inside surface of said tubing.

8. A device as claimed in claim 1, wherein said rod is made of material sufficient to withstand the adverse effects of fluids intended for acidizing operations within said well bore.

9. A device as claimed in claim 1, wherein the cross-section of said rod has the shape of a cylinder with at least three radially extending branches and wherein said cylinder is inscribed in a circle of a diameter substantially smaller than an inside diameter of said tubing.

10. Application of the device as claimed in claim 1 to a well bore of an oil well having a portion strongly deflected with respect to the vertical.

11. A process for assembling a device for carrying out measuring and/or servicing in a well bore, said tubing having a rod arranged centrally therein, which process comprises the following steps:
uncoiling the tubing from a storage drum and arranging the tubing in a linear path;
forming said rod by extrusion and/or pultrusion of polymeric material and incorporating a transfer line for transferring energy or information within said rod during said formation;
pushing said rod into said tubing by means of a thrust imparting means adapted to engage said rod, said rod being centered within said tubing; and coiling the tubing containing the rod arranged therein around a drum.

12. A process as claimed in claim 11, wherein said tubing is filled with a fluid during introduction of said rod into said tubing, said fluid allowing the rod to pass through the tube easily.

* * * * *